United States Patent
Capoccia

(10) Patent No.: US 11,608,757 B2
(45) Date of Patent: Mar. 21, 2023

(54) CRANK DEVICE FOR PERFORMING TURBINE ENGINE MAINTENANCE

(71) Applicant: Parker-Hannifin Corporation, Cleveland, OH (US)

(72) Inventor: Claudio Capoccia, Littleton, MA (US)

(73) Assignee: Parker-Hannifin Corporation, Cleveland, OH (US)

( * ) Notice: Subject to any disclaimer, the term of this patent is extended or adjusted under 35 U.S.C. 154(b) by 109 days.

(21) Appl. No.: 17/209,795

(22) Filed: Mar. 23, 2021

(65) Prior Publication Data

US 2021/0310378 A1 Oct. 7, 2021

Related U.S. Application Data

(60) Provisional application No. 63/104,889, filed on Oct. 23, 2020, provisional application No. 63/004,011, filed on Apr. 2, 2020.

(51) Int. Cl.
*F01D 25/34* (2006.01)
*F01D 25/20* (2006.01)

(52) U.S. Cl.
CPC ............ *F01D 25/34* (2013.01); *F01D 25/20* (2013.01)

(58) Field of Classification Search
CPC .................................. F01D 25/20; F01D 25/34
See application file for complete search history.

(56) References Cited

U.S. PATENT DOCUMENTS

| | | | | |
|---|---|---|---|---|
| 5,813,829 A | * | 9/1998 | Mazzotta | ............... F01D 25/34 464/169 |
| 6,382,909 B1 | * | 5/2002 | Voorhees | ............... F04D 17/08 464/169 |
| 7,065,954 B2 | | 6/2006 | Labala | |
| 7,559,739 B2 | | 7/2009 | Colonna et al. | |
| 7,685,826 B2 | | 3/2010 | McCooey et al. | |
| 8,450,871 B2 | | 5/2013 | Trede | |
| 2021/0156280 A1 | * | 5/2021 | Gebhard | ................ F16N 7/385 |

FOREIGN PATENT DOCUMENTS

JP 4490553 6/2010

* cited by examiner

*Primary Examiner* — David E Sosnowski
*Assistant Examiner* — Jason G Davis
(74) *Attorney, Agent, or Firm* — Renner, Otto, Boisselle & Sklar, LLP

(57) ABSTRACT

A maintenance system for a turbine engine includes a pump and a crank device operatively coupled to the pump. The pump includes a pump housing and a pump drive that is configured to operatively couple to the turbine engine. The crank device is operatively coupled to the pump and includes a crank drive that is configured to enable movement of the pump drive and thereby movement of the turbine engine during non-operational periods, such as during a maintenance or inspection period.

20 Claims, 2 Drawing Sheets

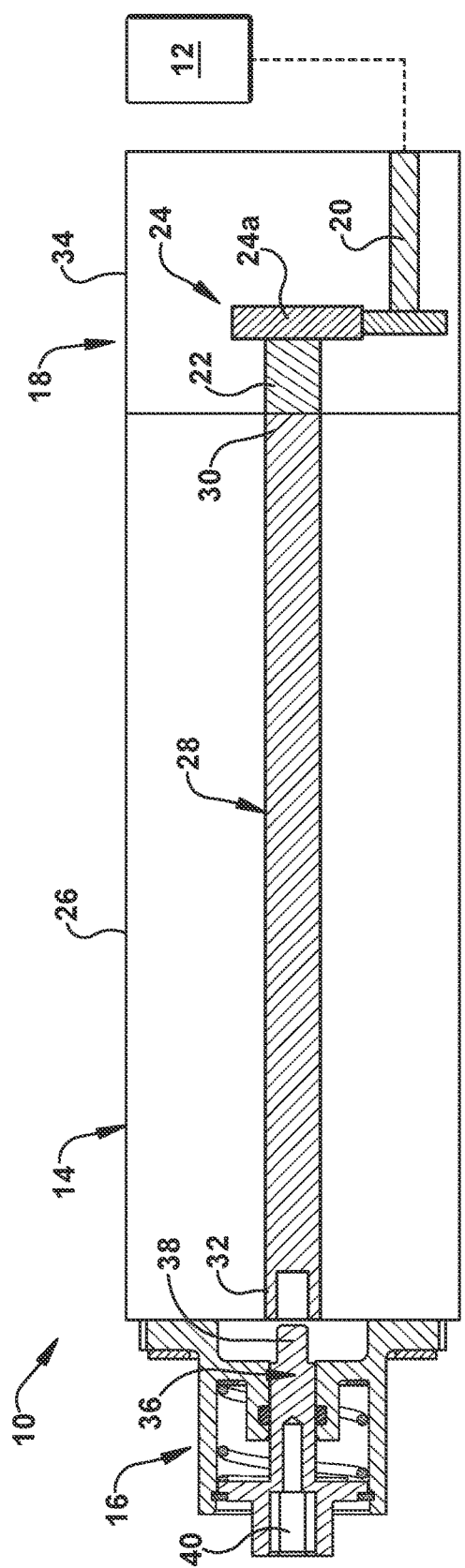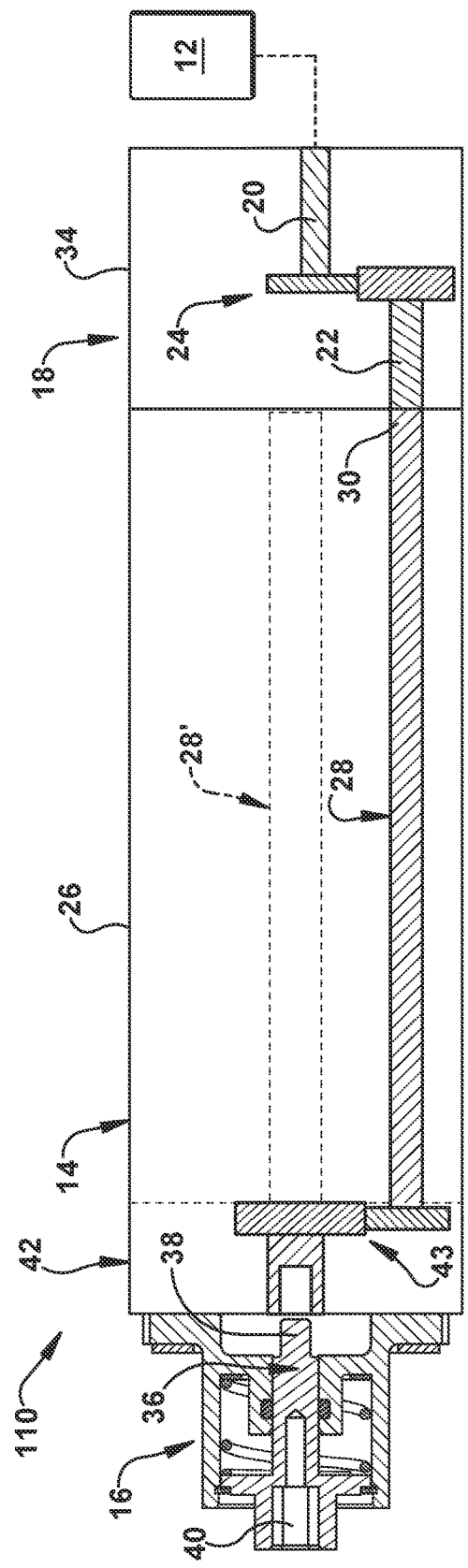

CRANK DEVICE FOR PERFORMING TURBINE ENGINE MAINTENANCE

RELATED APPLICATIONS

This application claims the benefit of both U.S. Provisional Application No. 63/004,011 filed Apr. 2, 2020 and U.S. Provisional Application No. 63/104,889 filed Oct. 23, 2020, both of which are incorporated herein by reference in their entireties.

TECHNICAL FIELD

The present invention relates generally to a device or method for facilitating turbine engine inspections and/or maintenance, and more particularly to a crank device for performing such inspection and/or maintenance, and even more particularly to a crank device integrated with a turbine engine driven pump, such as for use in aircraft turbine engine systems.

BACKGROUND

Aircraft turbine engines typically include a compressor, a combustor, and a turbine that is coupled to the compressor. Generally, the turbine engine may be used to power various accessory devices on the aircraft. For example, at least one conventional type of aircraft system includes a turbine engine and an accessory gearbox that is coupled to either the compressor or the turbine of the engine, such that driving of the gearbox by the engine provides the motive force to drive various accessory devices that may be coupled to an output of the gearbox.

Aircraft turbine engines generally require routine inspection and maintenance. One type of inspection and maintenance procedure is a borescope inspection. During such a borescope inspection, for example, the turbine engine is rotated manually to more fully inspect and perform the maintenance procedure.

SUMMARY

Various tools have been employed to perform such maintenance and inspection described above. For example, the accessory gearbox may include an access port through which a tool can be inserted for directly driving the gears within the gearbox and thus the turbine engine. Other devices also have been employed that are directly coupled to the turbine engine or gearbox for manual rotation thereof. An underlying problem with such devices, however, is that their location on the aircraft makes them difficult to access for performing the maintenance procedure. This results in a burdensome process that causes unwanted downtime of the aircraft. In addition, these separate devices may require further additional components that can add considerable weight and cost to the aircraft.

An aspect of the present disclosure provides an improved device and/or method for performing turbine engine inspections and/or maintenance, such as for aircraft system(s).

More particularly, an aspect of the present disclosure provides an exemplary crank device that can operatively turn the turbine engine during an inspection or maintenance procedure by employing or cooperating with another device having preexisting aircraft functionality with the turbine engine. This enables the exemplary crank device to use the preexisting functionality of the other device to improve access for turning the turbine engine, while also enabling a reduction in weight and cost by using the preexisting features of the other device.

In an aircraft system, for example, a pump conventionally is one of the accessory devices that already is operatively mounted with the accessory gearbox and that is driven by the turbine engine via the gearbox. For example, a lubrication subsystem of the aircraft system may include a lubrication and scavenge pump that provides oil flow to the gearbox and main shaft bearings. A hydraulic subsystem of the aircraft system may include a hydraulic pump that provides hydraulic fluid to fluid-operated consumers, such as motors or actuators that operate components, such as flaps, landing, steering, or the like. A fuel subsystem of the aircraft system may include a fuel pump that delivers fuel to the turbine engine.

According to an aspect of the present disclosure, a crank device is integrated with a pump of a system or subsystem (e.g., aircraft system) that enables movement of the turbine engine transmission (e.g., gearbox) and/or turbine engine for performing inspection and/or maintenance during non-operational downtime of the engine.

The pump may be any suitable pump of the system or subsystem, such as a lubrication and scavenge pump, a hydraulic pump, a fuel pump, or the like. For aircraft systems, the pump may be operatively coupled to the accessory gearbox of the aircraft turbine engine, which such connection to the accessory gearbox may be in a conventional manner.

Such a crank device enables access to drive the turbine engine and/or gearbox drivetrain through driving of the pump with the crank device. For aircraft in which space and access are limited, such a crank device that enables driving of the gearbox and/or turbine engine through the pump makes the maintenance and inspection procedure easier because the location of the pump on the aircraft generally is more easily accessible. Such a crank device can be retrofitted onto existing pump designs, thereby improving industry acceptance and reducing costs. The crank device may be a relatively small unit integrated with the pump that reduces weight and cost compared to conventional designs.

According to an aspect, a maintenance system for a turbine engine includes: a pump having a pump housing and a pump drive that is configured to operatively couple to the turbine engine; a crank device operatively coupled to the pump and configured to enable driving of the pump drive and thereby movement of the turbine engine during non-operational periods when using the crank device, the crank device comprising: a crank drive having a first drive portion configured to operatively engage with and drive the pump drive, and a second drive portion configured for interfacing with an implement for driving the crank drive and thereby the pump drive which enables moving the turbine engine.

According to another aspect, an aircraft maintenance system includes: an aircraft device that is configured to be operatively driven by a turbine engine of the aircraft during normal operating conditions to provide an aircraft function; and a crank device operatively coupled to the aircraft device and configured to enable driving of the aircraft device during a non-operational period of the turbine engine to thereby enable movement of the turbine engine when using the crank device.

According to another aspect, a system includes: a turbine engine having a compressor, a combustor, and a turbine coupled to the compressor; a transmission gearbox coupled to at least one of the compressor and the turbine; and the maintenance system according to any of the foregoing features, wherein the pump of the maintenance system is operatively coupled to the transmission gearbox.

According to another aspect, an aircraft includes the foregoing system, wherein the turbine engine provides propulsion to the aircraft, and wherein the pump supplies fluid for operating an aircraft function.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 1 is a cross-sectional schematic view of an exemplary maintenance system for a turbine engine according to an embodiment.

FIG. 2 is a cross-sectional schematic view of another exemplary maintenance system for a turbine engine according to another embodiment.

DETAILED DESCRIPTION

Figure 3:
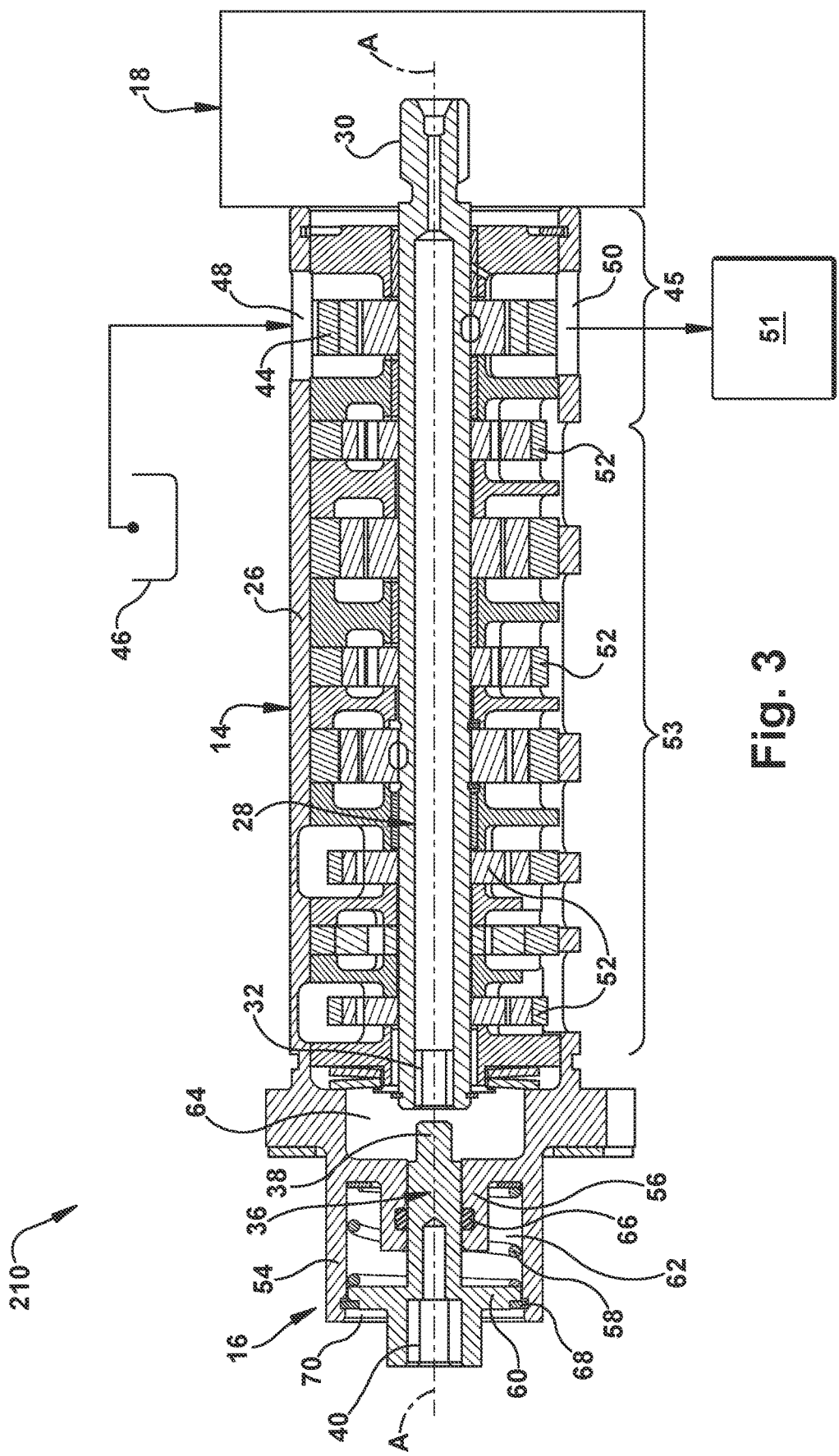
FIG. 3 is a cross-sectional view of an exemplary maintenance system for a turbine engine according to another embodiment.

The principles and aspects according to the present invention have particular application to aircraft systems, and more particularly to a turbine engine driven accessory in an aircraft subsystem, and thus will be described below chiefly in this context. It is understood, however, that the principles and aspects according to the present invention may be applicable to other turbine related systems, such as turbine engine systems for other types of vehicle propulsion, or turbines used in energy production, such as for use with powerplants, or the like.

Referring initially to FIG. 1, an exemplary maintenance system 10, or assembly, for an aircraft gas turbine engine 12 is shown. Generally, the maintenance system 10 includes a pump 14 that is operatively coupled to the turbine engine 12 when installed on the aircraft, and also includes a crank device 16 operatively coupled to the pump 14. As described in further detail below, the crank device 16 is configured to enable driving of the pump 14 and thereby rotation of the turbine engine 12 during non-operational periods, such as for facilitating inspection and/or maintenance of the gas turbine engine and/or other aircraft systems.

The gas turbine engine 12 may be any suitable engine for generating thrust of the aircraft, and generally includes a compressor, a combustor, and a turbine that is coupled to the compressor. As shown, at least one transmission 18, such as a gearbox, is interposed between the pump 14 and the turbine engine 12. The gearbox (also referred to with 18) generally has a first drive portion 20 and a second drive portion 22, in which during normal operation of the turbine engine, the first drive portion 20 is an input shaft to the gearbox 18 and the second drive portion 22 is an output shaft to the gearbox 18 that drives the pump 14. The transmission (e.g., gearbox 18) may contain any suitable number or types of input shafts, output shafts, and transmission elements (e.g., gears 24) as may be desired for the particular application, and which may depend on the number of components driven by the transmission 18. One or more transmissions, or gearboxes, may be provided between the transmission 18 and the turbine engine 12.

In exemplary embodiments, the gearbox 18 is an accessory gearbox of the aircraft system which is used to drive one or more accessories of the aircraft. For example, the accessory gearbox may be used to drive one or more fuel pumps (low pressure, high pressure, etc.), one or more generators, one or more lubricating oil pumps (e.g., lubrication and scavenger pumps); one or more hydraulic pumps; high or low pressure air compressors; engine starters; and the like. The accessory gearbox may be mounted on the aircraft in any suitable manner and at any suitable location, such as being operatively coupled to the output shaft of the turbine engine directly or via a transfer gear box and/or bevel gear, for example.

The pump 14 generally includes a pump housing 26, or body, for containing an operating fluid, and a pump drive 28 extending through the housing 26 for driving the pump 14 during normal operation and pumping the operating fluid through one or more ports of the pump 14. The pump housing 26 generally includes one or more input ports for receiving fluid, one or more pump elements for pressurizing and/or transferring the fluid, and one or more output ports for conveying the fluid downstream of the pump to a fluid consumer. The pump elements (e.g., piston-cylinders, vanes, gerotors, etc.) are operatively driven by the pump drive 28. As shown, the pump drive 28 generally has a first drive portion 30 and a second drive portion 32. During normal operation of the turbine engine 12, the first drive portion 30 is an input drive portion to the pump 14 that drives the pump elements and operates the pump. On the other hand, when the turbine engine is non-operational such as during a maintenance period, the second drive portion 32 of the pump drive is used by the crank device 16 to drive the pump drive 28, and thereby move the turbine engine 12 via the transmission 18.

The pump 14 may be any suitable type of pump for the aircraft system or subsystem. For example, the pump 14 may be a lubrication pump (e.g., lubrication and scavenge pump) of a lubrication subsystem that pumps a lubricant, such as oil, to regions of the aircraft, such as to the gearbox and main shaft bearings. Alternatively, the pump 14 may be hydraulic pump of a hydraulic subsystem that supplies hydraulic fluid to fluid-operated consumers, such as motors or actuators that operate components, such as flaps, landing, steering, or the like. Alternatively, the pump 14 may be a fuel pump of a fuel subsystem that delivers fuel to the turbine engine. The pump 14 may be mounted at any suitable location on the aircraft, such as distanced from and operatively coupled to the transmission 18 (e.g., gearbox), or the pump housing 26 may be mounted on a transmission case 34 (e.g., gearbox case 34) of the transmission 18. Exemplary, non-limiting, types of the pump 14 may be a positive displacement pump, a gerotor pump, a vane pump, a bent axis pump, an axial piston pump, a spur gear pump, or the like, for example.

In the illustrated embodiment of FIG. 1, the pump 14 includes only a single pump drive 28 in the form of a rotating drive shaft for providing a direct drive connection of the pump 14 to the transmission 18, with the first drive portion 30 being a first end portion of the shaft and the second drive portion 32 being a second opposite end portion of the shaft. In exemplary embodiments, the first drive portion 30 of the pump drive 28 may be the same drive shaft as the second drive portion 22 of the transmission 18, such that the rotational shaft of the pump drive 28 directly interfaces with gear 24a, such as with a spline connection. It is understood that the pump 14 may include any suitable number of drive shafts or intermediate elements, such as couplings or transmission elements (e.g., gears or the like), between its input and output sides as may be desired for the particular application.

The crank device 16 includes a crank drive 36 that is configured to interface with and drive the pump drive 28 when the turbine engine 12 is non-operational (such as during a maintenance period), to thereby rotate the turbine engine 12 via the transmission 18. The crank device 16 may be any suitable device or assembly configured to transmit an input force on the crank drive 36 into an output force that enables driving movement of the pump 14 to thereby move the turbine engine 12. As shown in the illustrated embodiment, the crank drive 36 generally includes a first drive portion 38 configured to operatively engage with and drive the pump drive 28, and a second drive portion 40 configured for interfacing with a tool or implement for driving the crank drive 36 and thereby the pump drive 28, which thereby rotates the turbine engine 12. When the turbine engine 12 is non-operational and the crank device 16 is in use, the second drive portion 40 of the crank drive 36 is an input drive portion (or crank drive input 40) and the first drive portion 38 is an output drive portion (or crank drive output 38). Consequently, when the crank drive 36 is in use and driving the pump 14, the second drive portion 32 of the pump drive 28 is the pump drive input 32 and the first drive portion 30 of the pump drive 28 is the pump drive output 30, and so on through the transmission 18 to the turbine engine 12. This designation of input and output when the turbine engine 12 is non-operational and the crank device 16 is in use will be used hereinafter unless otherwise noted.

The crank drive 36 of the crank device 16 may be operatively (drivingly) coupled to the pump drive 28 of the pump 14 in any suitable manner, such as with a direct drive connection (i.e., without transmission elements interposed between the crank drive input 40 and pump drive input 32), or with an indirect drive connection (i.e., with transmission elements interposed between the crank drive input 40 and pump drive input 32). Similarly, the entire operative driving connection from the crank drive input 40 to the pump drive output 30 (up to the transmission 18) may be a direct drive or indirect drive. FIG. 1 shows an example of such a direct drive connection from the crank drive input 40 to the pump drive output 30, in which no transmission elements, such as intermeshing gears, are provided between the crank drive input 40 and pump drive output 30. Such a direct drive system generally is less complex than an indirect drive system and thus may be more cost-effective.

Referring to FIG. 2, another exemplary embodiment of a maintenance system 110 is shown in which the crank device 16 includes or is operatively coupled to a transmission 42 interposed between the crank drive input 40 and the pump drive output 30 to provide an indirect drive between the crank drive input 40 and the pump drive output 30. The maintenance system 110 is substantially the same as the above-referenced maintenance system 10, and consequently the same reference numerals are used to denote structures corresponding to the same or similar type of structures in the maintenance systems 10, 110. The foregoing description of the maintenance system 10 is equally applicable to the maintenance system 110, except as noted below, and aspects of the maintenance systems 10, 110 may be substituted for one another or used in conjunction with one another where applicable.

Although more complex than the direct drive configuration shown in FIG. 1, the indirect drive configuration shown in FIG. 2 may be suitable for particular pump designs, such as axial piston pump designs, for example, as would be understood by those having ordinary skill in the art. In exemplary embodiments, the transmission 42 may be part of the crank device 16, may be part of the pump 14, or may be a discrete unit between the crank device 16 and the pump 14. Any suitable type of transmission may be employed, such as a gearbox having gears 43. The output shaft of the transmission 42 that is operatively coupled to the transmission 18 may be the same shaft as provided for the pump drive 28 for driving the pump elements. Alternatively, the output shaft of the transmission 42 that is operatively coupled to the transmission 18 may be separate from the pump drive 28' (shown in phantom view).

Turning to FIG. 3, another exemplary embodiment of a maintenance system 210 is shown, which illustrates a more specific example of an exemplary pump 14, in which the crank device 16 is operatively coupled to the pump 14 and the pump 14 is operatively coupled to the transmission 18. The foregoing description of the maintenance system 10 is equally applicable to the maintenance system 210, and consequently the same reference numerals are used to denote structures corresponding to the same or similar type of structures in the maintenance systems 10, 210.

In the illustrated embodiment of FIG. 3, the pump 14 is a lubrication and scavenge pump having pump housing 26 and pump drive 28 (e.g., rotating drive shaft) extending through the pump housing 26. The pump drive 28 drives at least one pump element 44 in a lubrication section 45 of the pump, which is a gerotor in the illustrated embodiment. The lubrication section 45 pumps oil from a reservoir 46 through an input port 48 of the housing 26 and out of an outlet port 50 to one or more components 51 of the aircraft, such as bearings, journals, and the like. The pump drive 28 also drives scavenge elements 52 in a scavenging section 53 of the pump, in which the oil that has been supplied by the pump 14 is returned to the reservoir 46 via respective ports and/or cores in the pump 14. The scavenging elements 52 may be the same or similar types of components as the pump element 44 rotatably supported on the shaft, such as gerotors, gears, vanes, or the like. As shown, the second (input) drive portion 30 of the pump drive 28 includes an interface for operatively (drivingly) coupling with the crank drive 36 of the crank device 16, and the opposite first (output) drive portion 30 of the pump drive 28 includes an interface for operatively (drivingly) coupling with the transmission 18, as described above. In the illustrated embodiment, the first (output) drive portion 30 includes a spline interface such that the pump drive output directly drives a driven gear of the transmission 18.

The crank device 16 shown in FIGS. 1-3 will now be described in further detail, with particular reference being had to FIG. 3 for simplicity. As shown, the crank device 16 includes a main body 54 that supports the crank drive 36 and which enables the crank device 16 to be operatively coupled to the pump 14. In the illustrated embodiment, the main body 54 is a crankcase 54 or housing that at least partially encompasses the crank drive 36, and through which the crank drive 36 at least partially extends. In exemplary embodiments, the main body 54 is operatively coupled to the pump housing 26 via any suitable means. In the illustrated embodiment, for example, the main body 54 is integral and unitary with the pump housing 26, such that the crank device 16 constitutes a crank portion of the maintenance system 210, and the pump 14 constitutes a pump portion of the maintenance system 210.

In exemplary embodiments, the crank drive 36 is a rotatable shaft that is supported in a support portion 56 of the main body 54 for rotation about a longitudinal axis A. In the illustrated embodiment, the first (output) drive portion 38 is a first end portion of the shaft and the second (input) drive portion 40 is a second opposite end portion of the shaft. In exemplary embodiments, the crank drive 36 also is axially movable in the direction of the longitudinal axis A for selectively engaging with or disengaging from the pump drive 28. An actuator or biasing member 58, such as a spring, may be provided to bias the crank drive 36 into a disengaged default position (as shown in FIG. 3). For example, one side of the biasing member 58 may engage a shoulder portion 60 of the crank drive 36, and an opposite side of the biasing member 58 may engage a portion of main body 54, such as the support portion 56. As shown, the main body 54, or crankcase, may form a chamber 62 for containing the biasing member 58. The default position of the crank drive 36 being disengaged from the pump drive 28 enables the crank drive 36 to remain stationary during normal use of the pump 14 when the turbine engine is operating. This can prevent wear of bearing surfaces associated with the crank drive 36, such as the radially inner surface of the support portion 56, that otherwise could affect performance of the pump 14.

In exemplary embodiments, the main body 54 of the crank device 16 may include an internal fluid chamber 64 that is in fluid communication with fluid in the pump housing 26. A divider may be provided in the main body 54 to fluidly separate the internal chamber 64 from the spring chamber 62 and/or external environment. In the illustrated embodiment, the divider is formed by the support portion 56. To prevent fluid, such as oil, from escaping the internal fluid chamber 64, one or more suitable seals 66 may be provided to seal against the rotatable shaft of the crank drive 36. In the illustrated embodiment, the one or more seals 66 may include elastomeric O-ring seals. The ability of the crank drive 36 to decouple from the pump drive 28 during normal, high-speed rotation when the turbine engine is operating may enable the use of such O-ring seals instead of high-speed seals (e.g., more rigid lip seals). As shown, the seal(s) 66 may be disposed within a groove in the internal surface of the support portion 56 at a position away from the internal fluid chamber 64. This enables the fluid (e.g., oil) from the internal fluid chamber 64 to provide lubrication over a greater area of the bearing interface between the crank drive 36 and support portion 56.

Still referring primarily to FIG. 3, an exemplary operation of the maintenance system 210 will now be described, it being understood that the following description is equally applicable to the systems 10 and 210 described above. As discussed above, FIG. 3 shows the crank device 16 of the maintenance system 210 in its default disengaged state from the pump drive 28 of the pump 14. In the illustrated state, the turbine engine is non-operational such that the pump 14 is not being driven by the transmission 18. As shown, in the default disengaged state, the crank drive 36 is biased away from the pump drive 28 via the biasing member 58 such that the first (output) drive portion 38 of the crank drive 36 is spaced apart from the second (input) drive portion 32 of the pump drive 28. In the illustrated embodiment, the main body 54 of the crank device 16 includes a suitable stop 68, such as a retaining ring, within the spring chamber 62 that engages a portion of the crank drive 36, such as the shoulder 60, to prevent the crank drive 36 from moving beyond the stop 68.

When a user, such as maintenance or inspection personnel, desires to rotate the turbine engine during maintenance or inspection, such as during a boroscope inspection, the user may activate the crank device 16 such that the crank drive 36 is in an engaged state with the pump drive 28. To perform such activation of the crank device 16, the user interfaces a tool or implement, such as a wrench, with the second (input) drive portion 40 of the crank drive 36. As shown, the second (input) drive portion 40 may protrude rearwardly through an opening 70 in the main body 54 such that the crank drive input is accessible for interfacing with the tool. In the illustrated embodiment, the engagement interface of the crank drive input 40 is a square or hexagonal recess for accepting a square or hexagonal wrench.

With the tool inserted into the crank drive input 40, the user then applies an axial force which overcomes the biasing force of the biasing member 58. The crank drive 36 slides against the bearing interface of the support portion 56 with seal(s) 66 still sealingly engaged. The axial movement of the crank drive 36 serves as a plunger that moves through the internal fluid chamber 64 until the crank drive output 38 interfaces with the second (input) drive portion 32 of the pump drive 28. In the illustrated embodiment, the engagement interface of the pump drive input 32 portion is a square recess that is configured to accept a square forward protrusion of the crank drive output 38. When properly engaged, the user may then apply torque via the wrench to the crank drive 36 which rotates the pump drive 28. The crank drive 36 and thus the pump drive 28 may be rotated clockwise or counterclockwise. The pump drive 28 drives the transmission 18 (e.g., accessory gearbox) via the splined interface with the transmission gear, which thereby rotates the turbine engine.

When the maintenance and/or inspection is complete, the user may remove the tool from the crank device 16. The biasing member 58 forces the crank drive 36 back to the disengaged state when not in use or when the user removes the axial tool force.

Such a design enables the crank device 16 to remain with the pump 14, and thus gas turbine engine, during all operational conditions, such as when the turbine engine is operating under gas power and is powering the other functional accessories via the accessory gearbox. As a result, the exemplary maintenance system 10, 110, 210 reduces the time to perform maintenance, and also provides a more user-friendly way to perform the maintenance procedure by providing the access point for manually rotating the turbine engine at the pump 14 via the crank device 16, which generally is more accessible for performing the maintenance. As such, the exemplary design reduces or eliminates the need for a separate crank device being located elsewhere on the space-constrained accessory gearbox, and thus also reduces the need to redesign the accessory gearbox. The exemplary maintenance system design may thus reduce cost and weight, and is highly-reliable. The exemplary design also may be retrofitted onto existing pump designs thereby further minimizing cost and improving industry acceptance.

An exemplary maintenance system 10, 110, 210 for a turbine engine has been described herein. The maintenance system 10, 110, 210 includes a pump 14 and a crank device 16 operatively coupled to the pump. The pump includes a pump housing 26 and a pump drive 28 that is configured to operatively couple to the turbine engine. The crank device 16 is operatively coupled to the pump 14 and includes a crank drive 36 that is configured to enable movement of the pump drive and thereby movement of the turbine engine during non-operational periods such as during a maintenance or inspection period.

While exemplary forms of the maintenance system 10, 110, 210 have been described above, it should be apparent to those having ordinary skill in the art that alternative configurations also could be employed. For example, although the maintenance system 10, 110, 210 has been described above as having the crank device 16 operatively coupled to the pump 14 of an aircraft, other functional accessories of the aircraft operatively coupled to the turbine engine also could be employed to operate with the crank device 16. Such functional accessories generally are operatively coupled to the turbine engine via the accessory gearbox and have an aircraft function when the turbine engine is operational (e.g., under gas power) or is starting such gas-powered operation. For example, such functional accessories to which the crank device 16 may be operatively employed may include a pump (as described above, such as a fuel pump, lubrication pump, hydraulic pump, etc.), a generator, an air compressor, an engine starter, and the like.

According to an aspect, a maintenance system for a turbine engine includes: a pump having a pump housing and a pump drive that is configured to operatively couple to the turbine engine; a crank device operatively coupled to the pump and configured to enable driving of the pump drive and thereby movement of the turbine engine during non-operational periods when using the crank device, the crank device comprising: a crank drive having a first drive portion configured to operatively engage with and drive the pump drive, and a second drive portion configured for interfacing with an implement for driving the crank drive and thereby the pump drive which enables moving the turbine engine.

According to another aspect, an aircraft maintenance system includes: an aircraft device that is configured to be operatively driven by a turbine engine of the aircraft during normal operating conditions to provide an aircraft function; and a crank device operatively coupled to the aircraft device and configured to enable driving of the aircraft device during a non-operational period of the turbine engine to thereby enable movement of the turbine engine when using the crank device.

According to another aspect, a system includes: an oil pump having a spline that has a first end configured to interface with a turbine transmission and a second end, a crank coupled to a housing of the oil pump, the crank having a plunger that is axially moveable to engage with the second end of the spline, the plunger being biased in a disengaged position, wherein when the plunger is engaged to the second end of the spline it can be rotated to transmit torque to the pump shaft thereby rotating the turbine.

Embodiments may include one or more features of the foregoing aspects, separately or in any combination, which may be combined with one or more of the following additional features, which may be included separately or in any combination.

In some embodiments, the crank drive is movable between a disengaged state, in which the first drive portion is disengaged from the pump drive, and an engaged state, in which the first drive portion is engaged with the pump drive for driving the pump drive and thereby enabling movement of the turbine engine.

In some embodiments, the crank device includes a biasing member that biases the crank drive to the disengaged state.

In some embodiments, the crank device includes a main body that supports the crank drive, the main body being operatively mounted to the pump housing.

In some embodiments, the main body at least partially surrounds the crank drive.

In some embodiments, the crank drive is a rotatable shaft that extends along a longitudinal axis and is axially movable along the longitudinal axis relative to the main body, the crank drive being axially movable between a disengaged position, in which the first drive portion is disengaged from the pump drive, and an engaged position, in which the first drive portion is engaged with the pump drive for rotatably driving the pump drive and thereby enabling movement of the turbine engine.

In some embodiments, the crank drive includes a radial shoulder portion.

In some embodiments, the crank device includes a biasing member that engages the radial shoulder portion to bias the crank device to the disengaged position.

In some embodiments, the main body includes a stop that is configured to engage the radial shoulder to restrict axial movement of the crank drive when the crank drive is in the disengaged position.

In some embodiments, the main body includes an internal fluid chamber that is in fluid communication with fluid in the pump.

In some embodiments, the crank drive extends through the internal fluid chamber at least when engaging the pump drive.

In some embodiments, the main body includes one or more seals that seal against the crank drive to fluidly seal the internal fluid chamber.

In some embodiments, the main body includes a divider having a through-opening through which the crank drive extends, the divider having one or more seal grooves that contain the one or more seals.

In some embodiments, the crank drive is slidably movable relative to the divider along a longitudinal axis between an axially rearward position in which the first drive portion is disengaged from the pump drive, and an axially forward position in which the first drive portion is engaged with the pump drive for rotatably driving the pump drive and thereby enabling movement of the turbine engine.

In some embodiments, the one or more seals maintain sealing engagement with the crank drive in both the axially rearward and axially forward position.

In some embodiments, the main body includes an opening at a rearward end portion of the main body, and wherein the second drive portion protrudes through the opening rearwardly of the rearward end portion of the main body when the crank drive is in the axially rearward position.

In some embodiments, the crank drive and the pump drive together provide a direct drive between an input of the crank drive and an output of the pump drive.

In some embodiments, the crank drive and the pump drive together provide an indirect drive with a transmission element interposed between an input of the crank drive and an output of the pump drive.

In some embodiments, the pump is a positive displacement pump, a gerotor pump, a vane pump, a bent axis pump, an axial piston pump, a spur gear pump, a lubrication, a lubrication and scavenge pump, a hydraulic pump, or a fuel pump.

In some embodiments, the pump drive is a rotatable shaft that is configured to interface with a transmission of the turbine engine.

According to another aspect, a system includes: a turbine engine having a compressor, a combustor, and a turbine coupled to the compressor; a transmission gearbox coupled to at least one of the compressor and the turbine; and the maintenance system according to any of the foregoing features, separately or in any combination, wherein the pump of the maintenance system is operatively coupled to the transmission gearbox.

According to another aspect, an aircraft includes the foregoing system, wherein the turbine engine provides propulsion to the aircraft, and wherein the pump supplies fluid for operating an aircraft function.

In some embodiments, the transmission gearbox is an accessory gearbox.

In some embodiments, the pump is a lubrication and scavenging pump having a gerotor pump element and one or more scavenging elements.

In some embodiments, the aircraft device is a fuel pump, a generator, a lubricating oil pump, a hydraulic pump, an air compressor, or an engine starter.

As used herein, an "operative" connection or coupling, or a connection by which entities are "operatively" connected or coupled, is one in which the entities are connected in such a way that the entities may perform as intended. An operative connection may be a direct connection or an indirect connection in which an intermediate entity or entities cooperate or otherwise are part of the connection or are in between the operably connected entities. An operative connection or coupling may include the entities being integral and unitary with each other.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

The phrase "and/or" as used herein should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A maintenance system for a turbine engine, the maintenance system comprising:
    a pump having a pump housing and a pump drive that is configured to operatively couple to the turbine engine;
    a crank device operatively coupled to the pump and configured to enable driving of the pump drive and thereby movement of the turbine engine during non-operational periods when using the crank device, the crank device comprising:
    a crank drive having a first drive portion configured to operatively engage with and drive the pump drive, and a second drive portion configured for interfacing with an implement for driving the crank drive and thereby the pump drive which enables moving the turbine engine;
    wherein the crank device includes a main body that supports the crank drive, the main body being operatively mounted to the pump housing;
    wherein the main body at least partially surrounds the crank drive; and
    wherein the crank drive is a rotatable shaft that extends along a longitudinal axis and is axially movable along the longitudinal axis relative to the main body, the crank drive being axially movable between a disengaged position, in which the first drive portion is disengaged from the pump drive, and an engaged position, in which the first drive portion is engaged with the pump drive for rotatably driving the pump drive and thereby enabling movement of the turbine engine.

2. The maintenance system according to claim 1, wherein the crank device includes a biasing member that biases the crank drive to the disengaged position.

3. The maintenance system according to claim 1,
    wherein the crank drive includes a radial shoulder portion;
    wherein the crank device includes a biasing member that engages the radial shoulder portion to bias the crank device to the disengaged position; and
    wherein the main body includes a stop that is configured to engage the radial shoulder to restrict axial movement of the crank drive when the crank drive is in the disengaged position.

4. The maintenance system according to claim 1, wherein the crank drive and the pump drive together provide a direct drive between an input of the crank drive and an output of the pump drive.

5. The maintenance system according to claim 1, wherein the crank drive and the pump drive together provide an indirect drive with a transmission element interposed between an input of the crank drive and an output of the pump drive.

6. The maintenance system according to claim 1, wherein the pump is a positive displacement pump, a gerotor pump, a vane pump, a bent axis pump, an axial piston pump, a spur gear pump, a lubrication pump, a scavenge pump, a hydraulic pump, or a fuel pump.

7. A system, comprising:
    a turbine engine having a compressor, a combustor, and a turbine coupled to the compressor;
    a transmission gearbox coupled to at least one of the compressor and the turbine; and
    the maintenance system according to claim 1,
    wherein the pump of the maintenance system is operatively coupled to the transmission gearbox.

8. An aircraft comprising the system according to claim 7, wherein the turbine engine provides propulsion to the aircraft, and wherein the pump supplies fluid for operating an aircraft function.

9. The aircraft according to claim 8, wherein the transmission gearbox is an accessory gearbox.

10. The aircraft according to claim 9, wherein the pump is a lubrication and scavenging pump having a gerotor pump element and one or more scavenging elements.

11. The maintenance system according to claim 1,
wherein the main body includes an internal fluid chamber that is in fluid communication with fluid in the pump,
wherein the main body includes a divider having a through-opening through which the crank drive extends into the internal fluid chamber,
wherein the crank drive extends through the internal fluid chamber at least when engaging the pump drive, and
wherein the main body includes one or more seals that seal against the crank drive to fluidly seal the internal fluid chamber.

12. A maintenance system for a turbine engine, the maintenance system comprising:
a pump having a pump housing and a pump drive that is configured to operatively couple to the turbine engine;
a crank device operatively coupled to the pump and configured to enable driving of the pump drive and thereby movement of the turbine engine during non-operational periods when using the crank device, the crank device comprising:
a crank drive having a first drive portion configured to operatively engage with and drive the pump drive, and a second drive portion configured for interfacing with an implement for driving the crank drive and thereby the pump drive which enables moving the turbine engine;
wherein the crank device includes a main body that supports the crank drive, the main body being operatively mounted to the pump housing; and
wherein the main body includes an internal fluid chamber that is in fluid communication with fluid in the pump.

13. The maintenance system according to claim 12,
wherein the crank drive extends through the internal fluid chamber at least when engaging the pump drive; and
wherein the main body includes one or more seals that seal against the crank drive to fluidly seal the internal fluid chamber.

14. The maintenance system according to claim 12,
wherein the main body includes a divider having a through-opening through which the crank drive extends, the divider having one or more seal grooves that contain the one or more seals;
wherein the crank drive is slidably movable relative to the divider along a longitudinal axis between an axially rearward position in which the first drive portion is disengaged from the pump drive, and an axially forward position in which the first drive portion is engaged with the pump drive for rotatably driving the pump drive and thereby enabling movement of the turbine engine;
wherein the one or more seals maintain sealing engagement with the crank drive in both the axially rearward and axially forward position.

15. The maintenance system according to claim 14,
wherein the main body includes an opening at a rearward end portion of the main body, and wherein the second drive portion protrudes through the opening rearwardly of the rearward end portion of the main body when the crank drive is in the axially rearward position.

16. The maintenance system according to claim 12, wherein the pump drive is a rotatable shaft that is configured to interface with a transmission of the turbine engine.

17. The maintenance system according to claim 12,
wherein the crank drive is a rotatable shaft that extends along a longitudinal axis and is axially movable along the longitudinal axis relative to the main body, the crank drive being axially movable between a disengaged position, in which the first drive portion is disengaged from the pump drive, and an engaged position, in which the first drive portion is engaged with the pump drive for rotatably driving the pump drive and thereby enabling movement of the turbine engine.

18. The maintenance system according to claim 17,
wherein the crank device includes a biasing member that biases the crank drive to the disengaged position.

19. The maintenance system according to claim 12,
wherein the crank drive and the pump drive together provide a direct drive between an input of the crank drive and an output of the pump drive.

20. A maintenance system for a turbine engine, the maintenance system comprising:
a pump having a pump housing and a pump drive that is configured to operatively couple to the turbine engine;
a crank device operatively coupled to the pump and configured to enable driving of the pump drive and thereby movement of the turbine engine during non-operational periods when using the crank device, the crank device comprising:
a crank drive having a first drive portion configured to operatively engage with and drive the pump drive, and a second drive portion configured for interfacing with an implement for driving the crank drive and thereby the pump drive which enables moving the turbine engine;
wherein the crank drive and the pump drive together provide a direct drive between an input of the crank drive and an output of the pump drive.

* * * * *